United States Patent [19]
Hsieh et al.

[11] Patent Number: 6,070,897
[45] Date of Patent: Jun. 6, 2000

[54] FOOT PEG OF BICYCLE

[76] Inventors: Te-Tsai Hsieh, 23, Alley 11, Lane 250, Chung Hua West Road; Chin-Feng Lin, 88, Lane Chang An, Hsiu Hsui Hsiang, both of Changhua; Ming-Liang Lin, 40, Alley 22, Lane 130, Tung Yang Road, Feng Yuan City, Taichung, all of Taiwan

[21] Appl. No.: 09/063,351

[22] Filed: Apr. 21, 1998

[51] Int. Cl.[7] ................................................. B62J 25/00
[52] U.S. Cl. ..................... 280/291; 74/564; 206/207; 206/377; 224/422; 296/75
[58] Field of Search .................... 280/291, 163, 280/164.1, 165, 201, 288.3, 288.4, 202; 74/564; 182/228.6, 228.5, 90, 127; 220/916; 224/418, 422; 296/75; 206/207, 549, 573, 226, 234, 302, 304, 372, 376, 377, 459.1; 81/DIG. 7

[56] References Cited

U.S. PATENT DOCUMENTS

| | | | |
|---|---|---|---|
| 625,368 | 5/1899 | Thompson | 280/291 |
| 866,995 | 9/1907 | Wright . | |
| 4,856,364 | 8/1989 | Dixon | 74/551.8 |
| 5,217,116 | 6/1993 | Ku | 206/374 |
| 5,454,580 | 10/1995 | Lin | 280/291 |
| 5,931,361 | 8/1999 | Schwimmer | 224/453 |

FOREIGN PATENT DOCUMENTS

| 10305 | 4/1897 | United Kingdom | 280/291 |
|---|---|---|---|

*Primary Examiner*—Anne Marie Boehler
*Attorney, Agent, or Firm*—Rabin & Champagne, P.C.

[57] ABSTRACT

A bicycle foot peg of a hollow construction is fastened at one end thereof with a bicycle frame and provided in the inner wall of the open end thereof with an inner threaded portion. A fitting seat is disposed in the hollow interior of the bicycle foot peg and provided with a plurality of slots for holding hand tools such as a screwdriver and wrench. An outer cap is used to seal off the open end of the foot peg such that the outer cap is engaged securely with the outer end of the fitting seat, which in turn is engaged with the inner threaded portion of the foot peg.

8 Claims, 4 Drawing Sheets

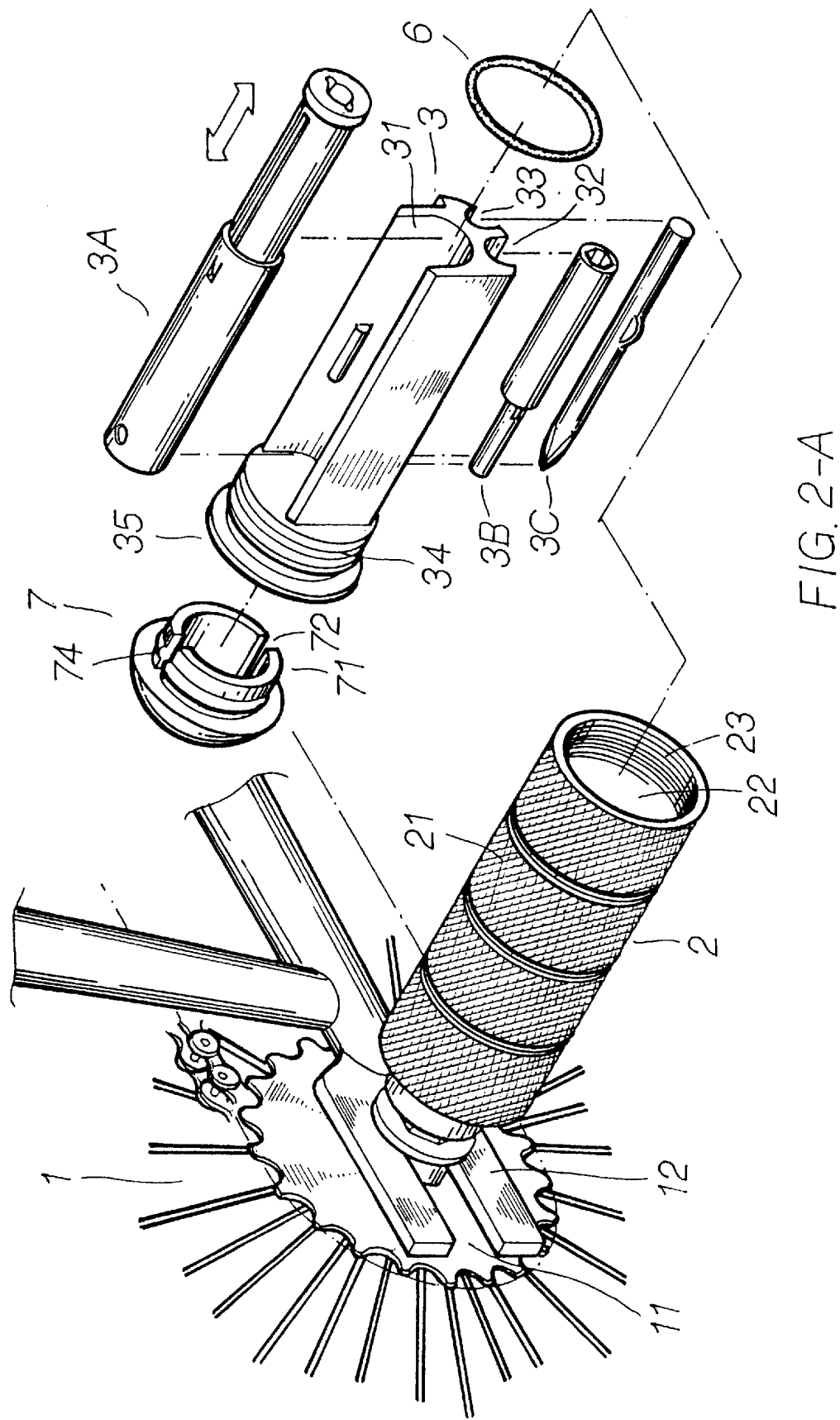
FIG. 2-A

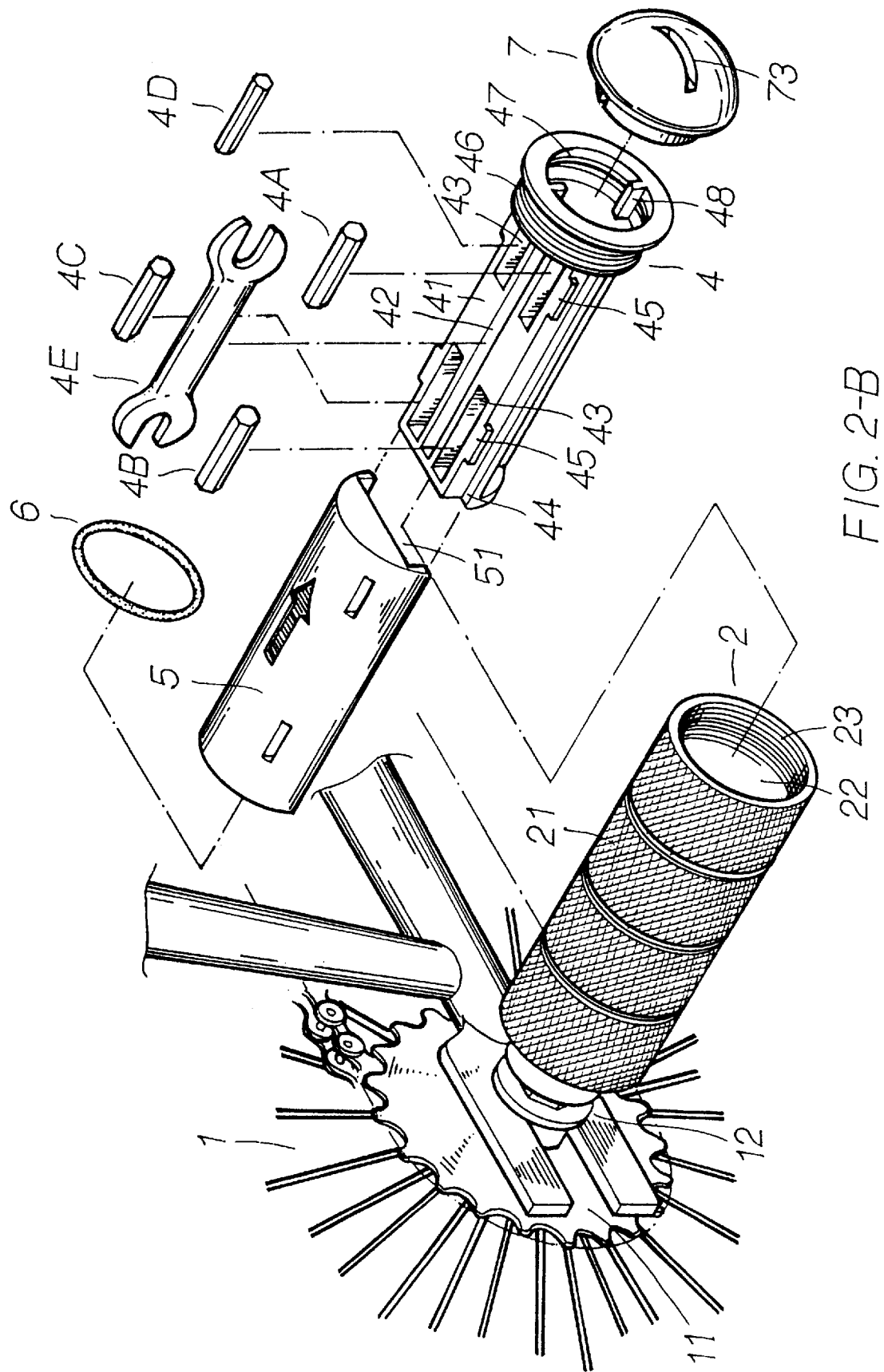
FIG. 2-B

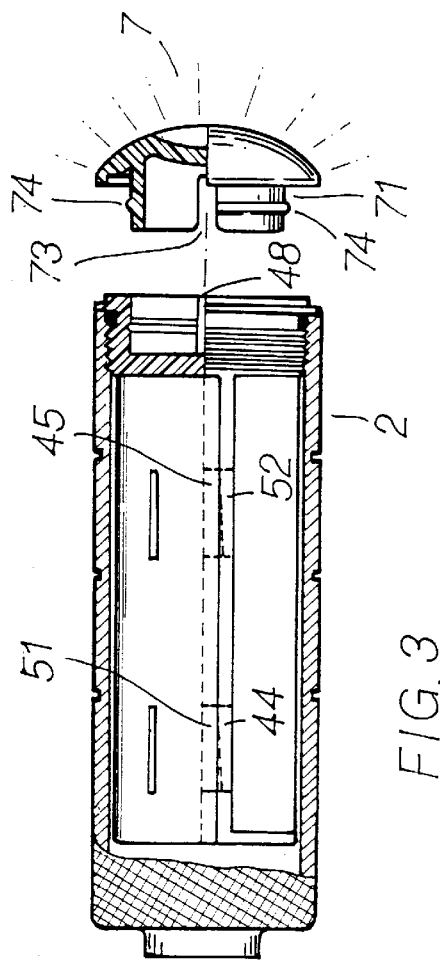
FIG. 3
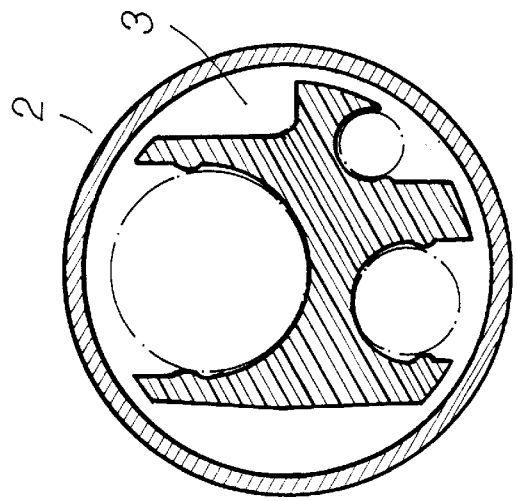
FIG. 4-B
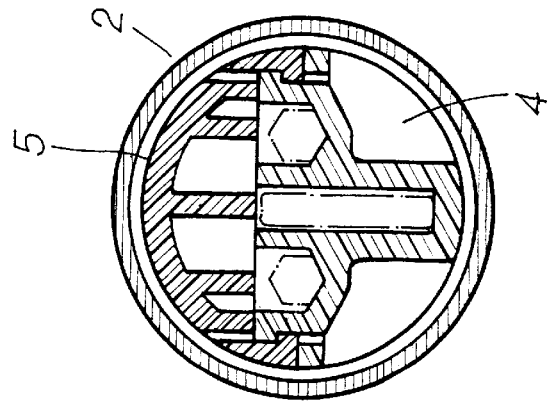
FIG. 4-A

FOOT PEG OF BICYCLE

FIELD OF THE INVENTION

The present invention relates generally to a bicycle accessory, and more particularly to a foot peg of the bicycle.

BACKGROUND OF THE INVENTION

The conventional bicycle foot peg is generally defective in design in that it is prone to become loosened, and that it can not be repaired in a DIY (do-it yourself) manner.

SUMMARY OF THE INVENTION

The primary objective of the present invention is to provide a bicycle foot peg free from the drawbacks of the conventional bicycle foot peg.

In keeping with the principle of the present invention, the foregoing objective of the present invention is attained by a bicycle foot peg which is of a hollow construction and can be used to hold various hand tools intended for use in repairing the bicycle foot peg or other bicycle component parts in a DIY (do-it-yourself) fashion.

The foregoing objective, features, functions, and advantages of the present invention will be more readily understood upon a thoughtful deliberation of the following detailed description of the present invention with reference to the accompanying drawings.

BRIEF DESCRIPTION OF THE DRAWINGS

FIG. 2A shows an exploded view of the present invention.

FIG. 2B shows another exploded view of the present invention.

FIG. 3 shows a sectional side view of the present invention.

FIG. 4A shows a sectional view of the present invention in combination.

FIG. 4B shows another sectional view of the present invention in combination.

DETAILED DESCRIPTION OF THE INVENTION

Figure 1:
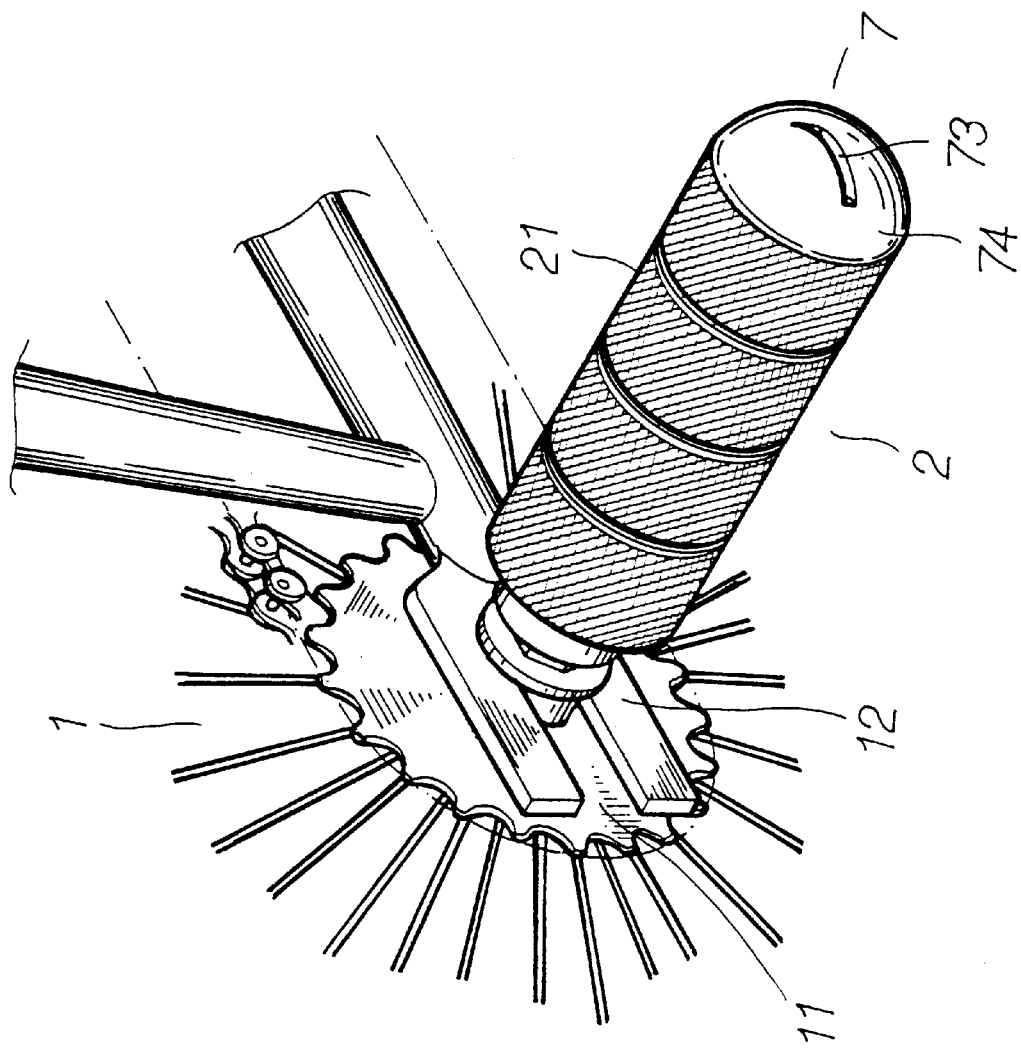
FIG. 1 shows a perspective view of the present invention.

As shown in all drawings provided herewith, a foot peg 2 is mounted at an axis 12 of a front rear fork end 11 of a bicycle 1. The foot peg 2 embodied in the present invention is of a hollow construction and is provided with a raised outer surface 21. The foot peg 2 has an open end 22, which is provided in the inner wall thereof with an inner threaded portion 23.

The foot peg 2 is characterized in that it is provided in the hollow interior thereof with two fitting seats 3 and 4 for holding various hand tools, such as a screwdriver 3C and wrenches 3A, 3B, 4E, and hexagonal wrench heads 4A, 4B, 4C, and 4D, as shown in FIG. 2A and FIG. 2B.

The first fitting seat 3 is provided with a plurality of slots 31, 32, and 33, which extend along the direction of the longitudinal axis of the first fitting seat 3, as shown in FIG. 2A.

The second fitting seat 4 has an upper surface 41 which is provided with a plurality of slots 42 and 43 for holding hand tools, as shown in FIG. 2B. The upper surface 41 is further provided with two protruded blocks 45 located respectively in two longitudinal sides thereof The second fitting seat 4 is provided with two guide slots 44 extending along the direction of a longitudinal axis of the second fitting seat 4 for engaging a cover 5 such that the protruded bodies 52 of the slots 51 of the cover 5 are opposite to the protruded blocks 45 of the second fitting seat 4.

The fitting seats and 4 are provided respectively with outer threaded portions 34, 46 which are engaged with the inner threaded portion 23 of the foot peg 2 in conjunction with a washer 6. The fitting seats 3 and 4 are further provided with a round slot 35 (47), which is in turn provided with a protruded block 48 opposite in location to a groove 72 of a protruded edge 71 of an outer cap 7. The cap 7 is provided with an outer slot 73 for rotating the cap 7. The protruded edge 71 is (47) provided with a protruded ring 74, which is engaged with the round slot 35 (47). The outer cap 7 is capable of reflecting light and can be used as a reflector.

What is claimed is:

1. A bicycle foot peg, comprising:

a foot peg of a hollow construction and being fastenable at one end thereof with a bicycle frame, said foot peg having an open end in communication with a hollow interior of said foot peg, and having an inner threaded portion at the open end;

a fitting seat located in the hollow interior of said foot peg and being provided with a plurality of slots for holding hand tools, and having an exterior threaded portion that is engagable with the inner threaded portion of said foot peg; and an outer cap engagable with an outer end of said fitting seat.

2. The bicycle foot peg as defined in claim 1, wherein said outer cap is comprised of a light-reflecting material.

3. The bicycle foot peg as defined in claim 1, wherein the tools include a screwdriver and a wrench.

4. The bicycle foot peg as defined in claim 1, wherein said fitting seat includes a round slot formed in an inner wall at the outer end thereof, and wherein said outer cap includes a protruded edge that fits within the fitting seat and against the inner wall, said outer cap further having a protruded ring disposed on the protruded edge, said protruded ring engaging with the round slot to hold said outer cap to said fitting seat.

5. A bicycle foot peg, comprising:

a foot peg of a hollow construction and being fastenable at one end thereof with a bicycle frame, said foot peg having an open end in communication with a hollow interior of said foot peg, and having an inner threaded portion at the open end;

a fitting seat located in the hollow interior of said foot peg, said fitting seat having an upper surface which is provided with a plurality of slots for holding tools, said fitting seat being provided with a cover which is engagable with said upper surface of said fitting seat, said fitting seat having an exterior threaded portion that is engagable with the inner threaded portion of said foot peg; and an outer cap engagable with an outer end of said fitting seat.

6. A bicycle foot peg as defined in claim 5, wherein said outer cap is comprised of a light-reflecting material.

7. The bicycle foot peg as defined in claim 5, wherein said fitting seat includes a round slot formed in an inner wall at the outer end thereof, and wherein said outer cap includes a protruded edge that fits within the fitting seat and against the inner wall, said outer cap further having a protruded ring disposed on the protruded edge, said protruded ring engaging with the round slot to hold said outer cap to said fitting seat.

8. The bicycle foot peg as defined in claim 5, wherein the tools include a wrench and a plurality of wrench heads.

* * * * *